July 11, 1961 N. B. WILSON 2,991,865
ANTI-RATTLE ASSEMBLY FOR A CENTRIFUGAL CLUTCH
Filed Nov. 12, 1959 2 Sheets-Sheet 1
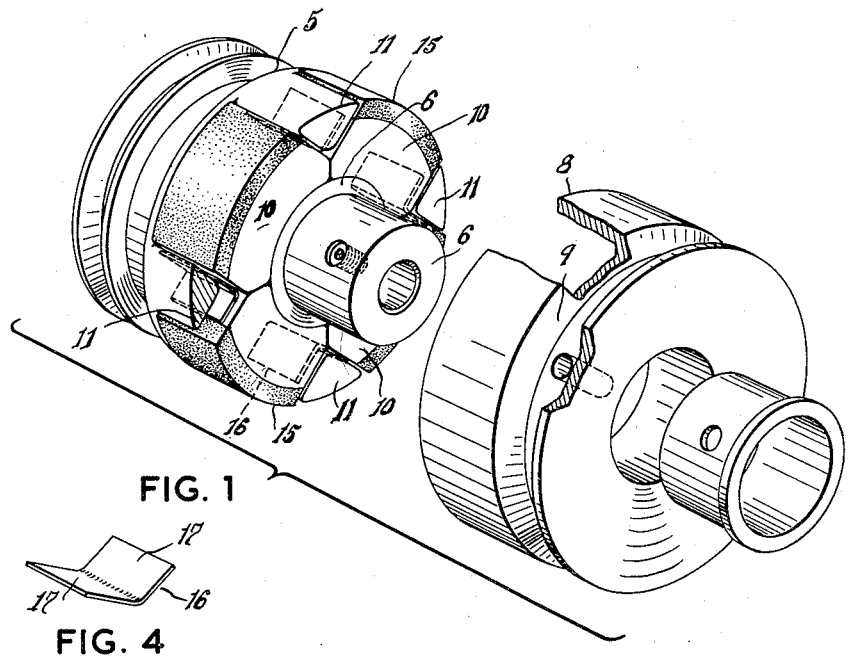
FIG. 1
FIG. 4
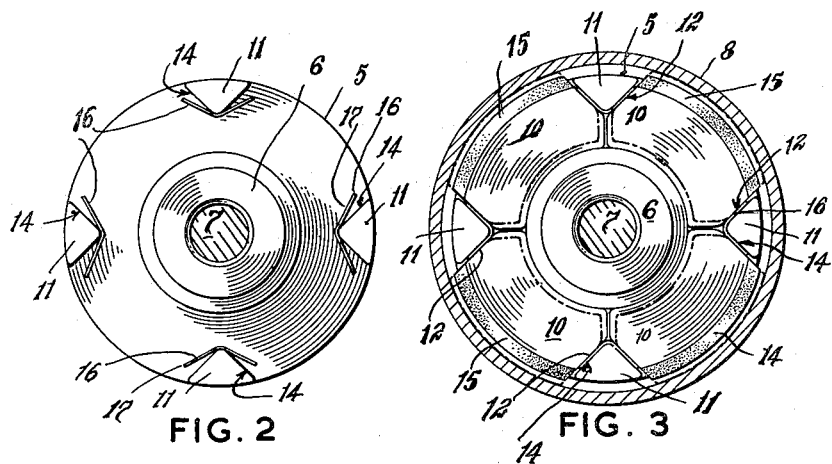
FIG. 2
FIG. 3
INVENTOR
NORMAN B. WILSON
BY *Frederick E. Bromley*
ATTORNEY

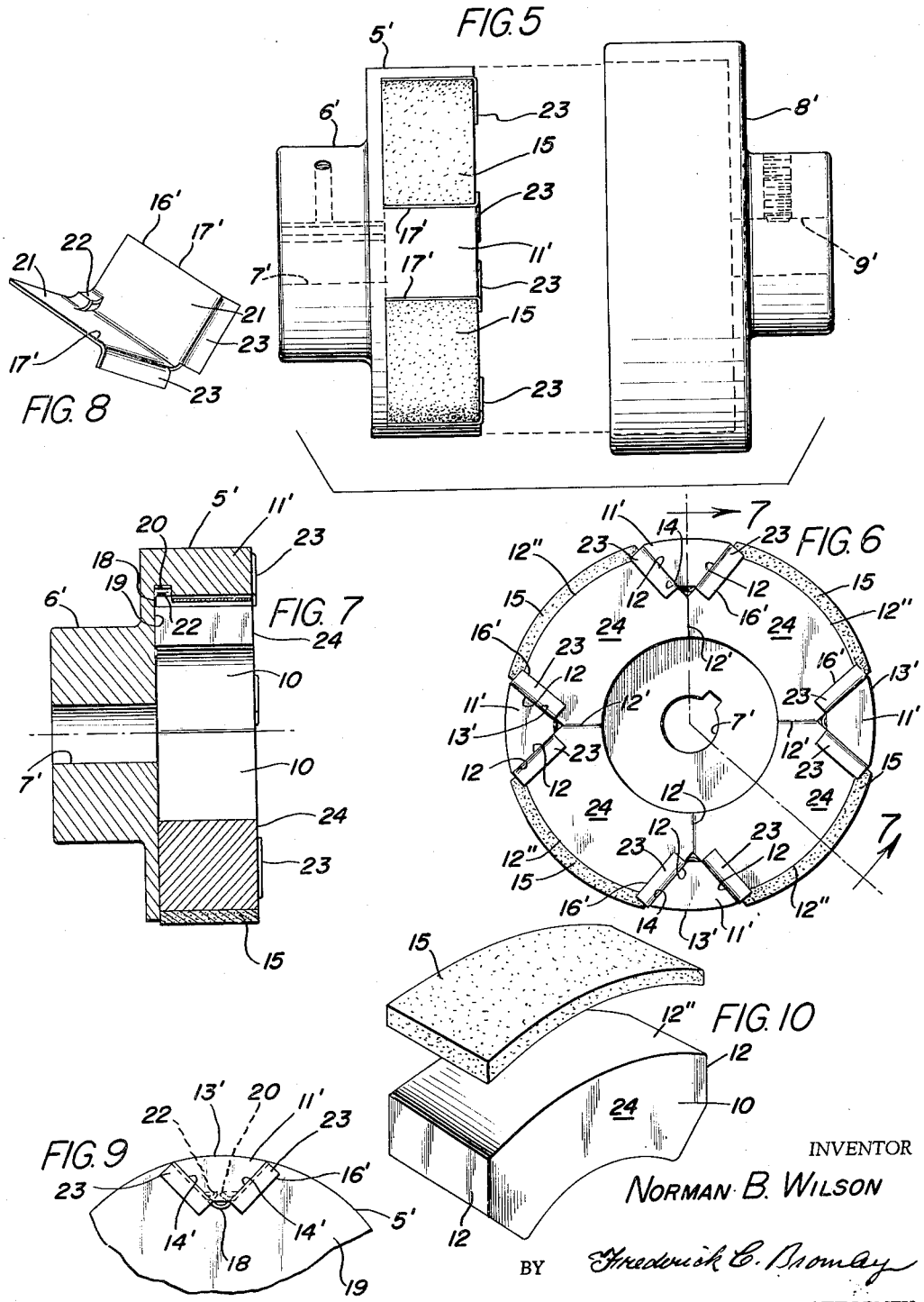

United States Patent Office 2,991,865
Patented July 11, 1961

2,991,865
ANTI-RATTLE ASSEMBLY FOR A CENTRIFUGAL CLUTCH
Norman B. Wilson, 1 Wingate Place, Toronto, Ontario, Canada
Filed Nov. 12, 1959, Ser. No. 852,573
5 Claims. (Cl. 192—105)

My invention relates to improvements in a well known form of centrifugal clutch comprising a driving member rotatable about an axis and provided with a plurality of driving dogs equidistantly spaced and interposed between adjacent shoes which are supplied with friction faces and adapted to be brought into frictional contact with a drum in the form of a driving member by centrifugal force. In a centrifugal clutch of this type, there is a complement of arcuate shoes encircling the axis of rotation in ring-like formation and the ends of the shoes have abutment faces which are parallel so that they may move freely in radial directions between outwardly divergent side faces on the driving dogs. The driving faces of the dogs are abutment faces which are divergent so as to reside in parallel relation to the end faces of the respective adjacent shoes. In such an organization sufficient clearance must be provided in order that the shoes may operate freely and naturally there is a certain amount of attendent noise in the operation of the clutch, due, in some measure, to the contraction of the shoes as the clutch comes to rest after an operational action. In some installations the noise may not be objectionable, however, in light-duty clutches of the kind employed in automatic washing machines, for instance, it is most desirable that the clutch operates silently.

This invention comprises a continuation-in-part over my copending application Serial Number 727,960, filed April 11, 1958, now abandoned.

Hence, it is a primary object of the present invention to provide a noiseless clutch assembly for a centrifugal clutch of the kind referred to, and one which is economical and highly serviceable. More particularly the invention appertains to anti-rattle means for a centrifugal clutch of the kind referred to, and particularly one which does not call for any decided change in the construction and arrangement of the clutch components and which provides for ready assembly of the clutch parts.

According to my invention I provide an anti-rattle device comprising V-shaped leaf springs of flat stock having divergent arms possessed of a greater angle of divergency when relaxed than the angle of divergency of the abutment faces of the driving dogs. Optionally, these springs are mounted upon certain or all of the driving dogs with the arms of the springs flanking the side faces thereof, and tensioned against the abutment faces respectively of adjacent shoes. According to this organization the springs bear on the abutment faces of the shoes and press them toward the respective opposite driving dogs, thereby taking up all the play and prohibiting chatter and rattle which may arise as the dogs move radially in operational movements. It will be apparent that the leaf springs can be readily assembled and when once assembled, are captive in their respective locations with the advantage that they do not require any extraneous locating and positioning means. Moreover, due to the fact that the springs are made of high carbon steel and hardened, they present wear faces to the adjacent end faces of the shoes, which preclude wear and tear on the shoes and thus provide a more durable clutch.

And a further and primary object of this invention is to provide an anti-rattle device of the character involved including V-shaped springs facilitating radial movement of clutch shoes between driving dogs providing bearing surfaces and retraction of the shoes, and additionally including means preventing axial movement of the shoes in their housing and accompanying rattling between the shoes and dogs, as well as aiding to retain the clutch faces on the shoes.

With these and other subsidiary objects in view the invention comprises a novel construction and arrangement of parts as described in the ensuing specification and shown in the accompanying drawing forming a part thereof.

In the drawing,

FIGURE 1 is an exploded perspective view of a centrifugal clutch incorporating the improvement of the present invention;

FIGURE 2 is an end view of the driving member of the clutch, showing how the V-shaped springs are placed on the drive dogs;

FIGURE 3 is a transverse sectional view of the clutch, showing the springs properly placed between adjacent shoes to flank the side faces of the drive dogs;

FIGURE 4 is a view in perspective of one of the V-shaped springs;

FIGURE 5 is an exploded side elevation of another embodiment of the centrifugal clutch incorporating the improved V-spring construction;

FIGURE 6 is an end view of the driving member of FIGURE 5;

FIGURE 7 is a section taken substantially on line 7—7 of FIGURE 6 showing the manner in which the V-spring abutment engages in the notched base of a driving dog;

FIGURE 8 is an enlarged perspective view of the improved anti-rattle spring;

FIGURE 9 is a fragmentary view of the driving member without the clutch shoes in situ; and FIGURE 10 is an enlarged exploded perspective view of a clutch shoe and lining of the invention.

In the drawing there is shown a light-duty clutch such as that as is well adapted for use in an automatic washing machine. This specific clutch organization is given by way of example but not of limitation.

The clutch comprises a driving member generally indicated at 5, having a hub portion 6 which is shown as locked or otherwise fastened to a shaft 7 which is suitably journalled for rotation in a supporting unit, the details of which do not concern the present invention. The driving member is driven from a power source to one form or another such as an electric motor in the case of an automatic washing machine, but this of course is incidental to the instant invention. The driving dogs are shown as integral with the driving member. These dogs as usual are equidistantly spaced around the driving member and project from a face thereof as is well konwn in the art.

Rotatable about the driving member is a driven member in the form of a drum as indicated at 8 and in the present disclosure, the driven member is journalled on the hub portion of the driving member and held against endwise movement by approved means. The driven member is fashioned with a belt groove which, in itself, does not form a part of the present invention. The shoes, of which there are a complement indicated at 10 are arcuate members well known in the art which encircle the axis of rotation in ring-like formation and the driving dogs denoted at 11 are interposed between them.

In this particular form of centrifugal clutch the shoes have parallel end faces designated 12 which abut the respective driving dogs and the abutment is made by the outwardly divergent side faces of the dogs, each of which is disposed in a plane parallel to an adjoining abutment face of the respective driving dog. The divergent faces of the driving dogs are denoted at 14.

Now, in the operation of the clutch, the shoes move outwardly under centrifugal force and have friction linings indicated at 15, which are forced into contact with the drum face. It is usual to make these linings loose with respect to the shoes and they have driving engagement by reason of abutment with the driving dogs.

Having described the conventional clutch to which my invention appertains the invention itself will now be described in detail. The improvement which is novel comprises the anti-rattle device including the V-shaped springs 16 of flat stock, which have divergent arms 17. These arms have a greater angle of divergency when relaxed than the angle of divergency of the side faces of the dogs 11. These spring steel members are about the width of the dogs and are placed thereon with their arms diverging at the side faces thereof. The arms are interposed between the respective side face of a dog and the adjoining abutment face of the adjacent shoe, clearance being provided of course to accommodate the intervening arms, with respect to adjacent shoes. Accordingly the arms of the springs flank the side faces of the driving dogs and are tensioned against the abutment faces respectively of the adjacent shoes.

The pressure exerted by the arms of the springs is sufficient to retain the shoes against undesirable movement and thus to preclude any tendency to rattle as the shoes move in the rotation of the driving member.

A distinctive feature is that the angular disposition of the arms of the springs with respect to the axis of rotation of the driving member, is inclined to press the shoes slightly to receded positions about the hub of the driving member, thereby lightly retaining the shoes in receded disposition when the clutch is at rest. A further and important feature is that the spring steel metal of the springs provides excellent wear faces for precluding wear of the abutment faces of the shoes whereby making a more durable and serviceable clutch structure.

Referring to the improved construction of FIGURES 5–10, a driving member 5' similar to that of the previously described embodiment includes a hub 6' having an axial bore 7' for securement to a suitably keyed drive shaft disposed therein. An annular driven member 8' will receive the driving member 5' therein, and includes an axial bore 9' which will have secured therein the end of a shaft to be driven.

The driving member 5' includes integral, radially spaced triangular driving dogs 11', having converging end faces 14' intersecting a circumferential segment 13'. Disposed between each of the dogs are arcuate clutch shoes 10, each including parallel end faces 12 continuing in angular abutment faces 12'. When the abutment faces 12' are in engagement with each other as seen in FIGURE 6, the arcuate clutch faces 12'' will be coaxial with the longitudinal axis of the driving member. The clutch faces of the shoes have disposed thereon arcuate friction linings 15 which are retained in position by V-springs 16' which have the additional function of preventing axial movement of the shoes 10 relative to the dogs 11'; as will subsequently be described. The V-springs 16' include divergent arms 17' and afford all of the desired functions of the embodiment of FIGURES 1–4 in addition to those to be subsequently described.

At the intersection 18 of the driving dogs adjacent the inner surface 19 of the driving member 5', each driving dog includes a notch or cut-out portion 20 which serves as a locking means for the spring 16'. The springs 16' include between the inner surfaces 21 of the divergent arms 17' in struck portions forming an abutment 22 which is received within the notch or cut-out portion 20 when the inner surfaces 21 are disposed upon the driving dogs. The abutments 22 when seated within the notches 20 will prevent axial movement of the springs 16' on the dogs 11'.

The springs 16' include on the divergent arms 17' retaining flanges 23 which extend away from the apex or intersection 19 of the driving dogs 11', and which will overlap the side 24 of the clutch shoes 10. The flanges 23 also overlap a portion of the linings 15 to retain them on the shoes. It will be observed that the cooperating notches 20 and abutments 22, together with the flanges 23 will prevent axial movement of the clutch shoes 10 relative to the longitudinal axis of the driver and driving member or in the direction in which the driving dogs project.

Thus there has been disclosed an improvement incorporating all the desirable features of the previously disclosed embodiment and contributing an improvement thereto which involves novel structure with an accompanying novel function.

This improved clutch structure has been found to be highly efficient and serviceable in use and moreover the springs do not add appreciably to the cost of the clutch and are readily assembled with the other components.

The advantages and utility of the invention will be greatly appreciated from the preceding description and it will be manifest that incidental changes may be made as fairly come within the scope of the ensuing claims.

What I claim is:

1. In a centrifugal clutch comprising an annular driving member having an axis of rotation, a driven member comprising an annular drum receiving said driving member axially therein, said driving member including a plurality of circumferentially spaced driving-dogs integral therewith and including an arcuate portion coinciding with the outer periphery of said driving member and continuing in converging abutment-face portions extending toward the axis of rotation of said driving member, the abutment-face portions of each driving-dog being parallel to the confronting abutment-face portion of the next adjacent driving-dog, a plurality of clutch shoes one of each reciprocally received for radial movement between each adjacent pair of driving-dogs and each including an arcuate clutch surface portion extending circumferentially between the arcuate portions of each pair of driving-dogs, each clutch shoe including parallel end portions, each end portion confronting in parallel relationship an abutment-face portion of a driving-dog, the parallel end portions of the clutch shoes being parallel to a respective abutment-face portion of a said driving-dog and terminating in converging faces extending toward the axis of rotation and abuttingly engageable with a similar adjacent confronting face of an adjacent clutch shoe upon radial inward movement, and a plurality of V-shaped leaf springs each including a pair of leg portions disposed at an angle greater than the angle of convergence of the abutment-faces of the driving-dogs, each of said leaf springs extending radially over the adjacent converging faces of its corresponding driving-dog in biased engagement between the adjacent ends of the adjacent pair of clutch shoes disposed on opposite sides of a respective driving-dog, said springs applying an end force to said shoes tending to cause said clutch shoes to recede radially in the absence of rotation of said driving member, and obviating rattling between the clutch shoes and the driving-dogs, said leg portions of said springs forming a bearing surface for the ends of said shoes during radial movement thereof.

2. In a centrifugal clutch comprising an annular driving member having an axis of rotation, a driven member comprising an annular drum receiving said driving member axially therein, said driving member including a plurality of circumferentially spaced driving-dogs integral therewith and including an arcuate portion coinciding with the outer periphery of said driving member and continuing in converging abutment-face portions extending toward the axis of rotation of said driving member, the abutment-face portions of each driving-dog being parallel to the confronting abutment-face portion of the next adjacent driving-dog, a plurality of clutch shoes one of each reciprocally received for radial movement between each adjacent pair of driving-dogs and each including an arcuate clutch surface portion extending circumferentially between the arcuate portions of each pair of driving-dogs, each clutch shoe including parallel end portions, each end portion confronting in parallel relationship an abutment-face portion of a driving-dog, the parallel end portions of the clutch shoes being parallel to a respective abutment-face portion of a said driving-dog and terminating in converging faces extending toward the axis of rotation and abuttingly engageable with a similar adjacent confronting face of an adjacent clutch shoe upon radial inward movement, and a plurality of V-shaped leaf springs each including a pair of leg portions disposed at an angle greater than the angle of convergence of the abutment-faces of the driving-dogs, each of said leaf springs extending radially over the adjacent converging faces of its corresponding driving-dog in biased engagement between the adjacent ends of the adjacent pair of clutch shoes disposed on opposite sides of a respective driving-dog, said springs applying an end force to said shoes tending to cause said clutch shoes to recede radially in the absence of rotation of said driving member, and obviating rattling between the clutch shoes and the driving-dogs, said leg portions of said springs forming a bearing surface for the ends of said shoes during radial movement thereof, said V-shaped leaf springs and driving-dogs including co-operating abutment portions preventing relative axial movement therebetween, said V-shaped leaf springs including flanges engaging said clutch shoes and preventing relative axial movement thereof in said driving member.

3. The structure of claim 2 in which said flanges on said leaf springs comprise divergent arms on one edge of each of said springs extending over adjacent end surface portions of respective clutch shoes.

4. The structure of claim 3 in which said flange portions extend over edge portions of said clutch shoes, said clutch surface portions of said shoes including a friction lining thereon engaged at one edge by flange portions of said springs for retaining them in position on said clutch shoes.

5. The structure of claim 3 in which said co-operating portions on said driving-dogs and V-shaped leaf springs comprise abutting portions at apex portions of the same.

References Cited in the file of this patent

UNITED STATES PATENTS

| | | |
|---|---|---|
| 1,843,712 | Else | Feb. 2, 1932 |
| 2,027,970 | Gillies | Jan. 14, 1936 |